Figure 1:
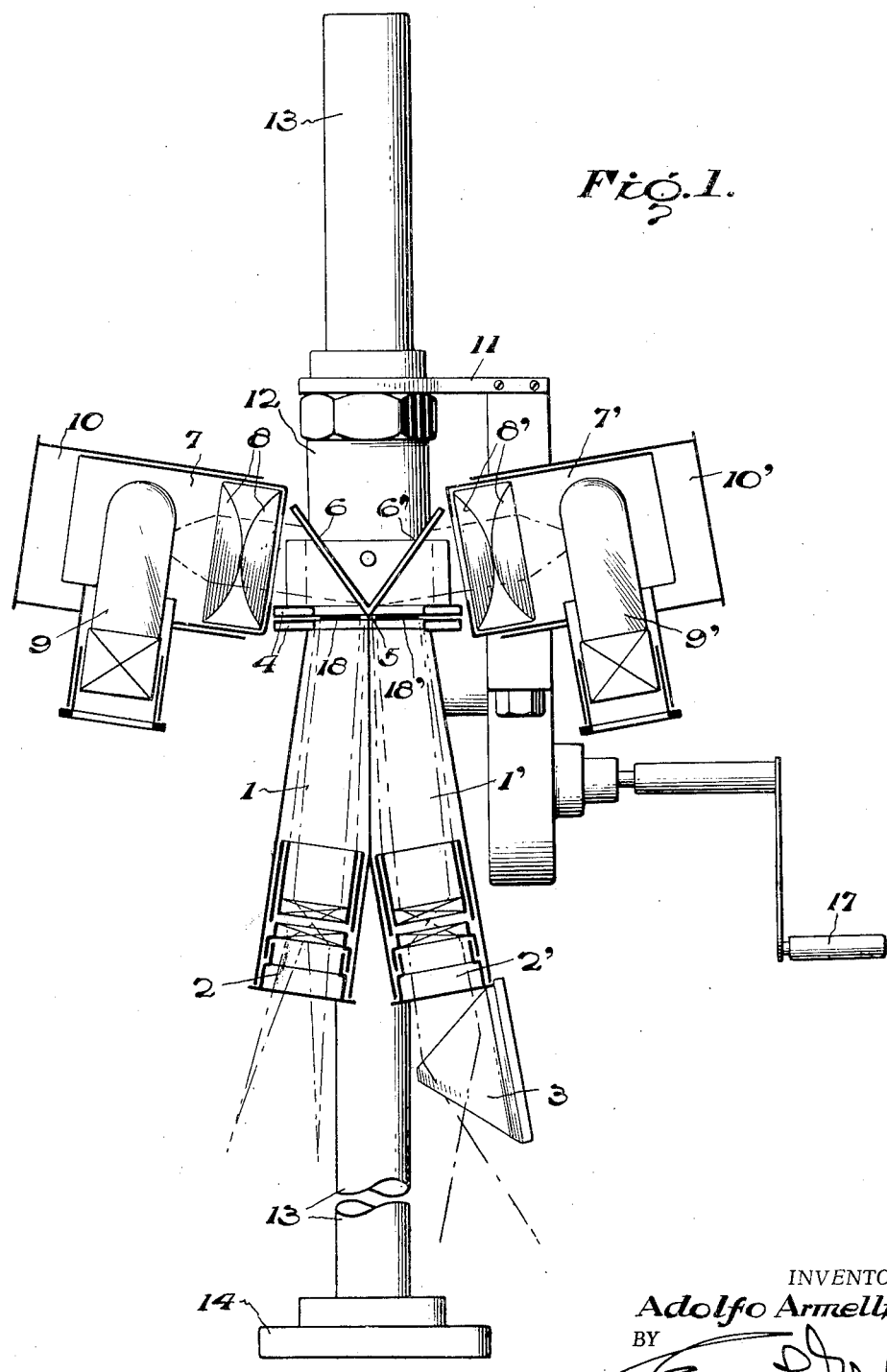

Nov. 15, 1949     A. ARMELLINO     2,488,258
DUPLEX PROJECTION PRINTER

Filed Jan. 10, 1947     2 Sheets-Sheet 1

INVENTOR.
Adolfo Armellino.
BY
ATTORNEY

INVENTOR
Adolfo Armellino.

Patented Nov. 15, 1949

2,488,258

UNITED STATES PATENT OFFICE 2,488,258

DUPLEX PROJECTION PRINTER

Adolfo Armellino, Montevideo, Uruguay

Application January 10, 1947, Serial No. 721,298

2 Claims. (Cl. 88—24)

The present invention refers to an apparatus for obtaining copies of double photographs that have been taken simultaneously on one and the same film, its main object being an apparatus comprising essentially a combined optical system for obtaining copies of negatives of films on which front and profile photographic views have been taken simultaneously of a certain person or object.

When taking simultaneous front and profile photographic views of a subject, certain defects become noticeable such as, for example, differences in size and luminosity of the two photographic images, and other no less important inconveniences.

In order to avoid such deficiencies the apparatus which is the object of this invention has been designed. By means of this apparatus it is possible not only to correct, at the very instant when the corresponding copies are being obtained, said defect in size and luminosity, but also to invert the negative image of one of the faces of the object, without thereby modifying the original position of the photographed subject, i. e., it is consequently possible to obtain a perfect copy from a defective negative, as pointed out above, said copy being adjusted to the most precise measurements. Thus, for the first time, it has been possible to solve a problem which, up to now, had effectively made it impossible to obtain double simultaneous photographs.

On the other hand, the apparatus object of the present invention is as easy to handle as the simplest of the known optical copying machines, no special training being required owing to the fact that, as has been stated, the necessary corrections are effected automatically and simultaneously and in less time than is demanded by the usual copying machines.

The invention likewise contemplates other accessory objects that will be made clear during the course of the present description.

In order that the invention may be more clearly understood and easily put into practice, same has been illustrated, as an example and in one of its preferred embodiments, in attached drawings.

Figure 2:
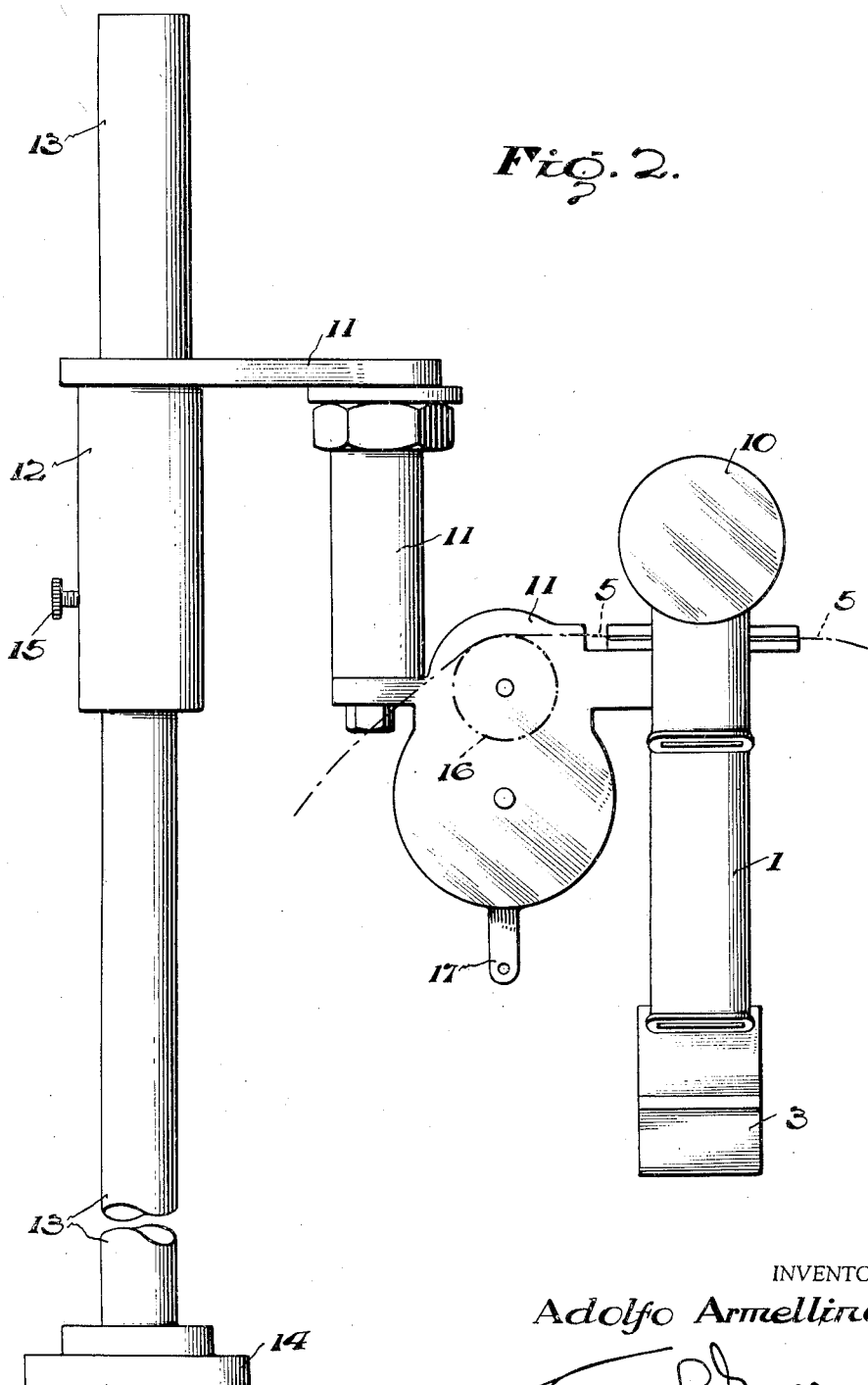

In the drawings:

Figure 1 is a frontal elevation diagrammatic detail view of the copying apparatus object of this invention, partially cut in order to show more clearly the arrangement of its component parts, and Figure 2 is another elevational diagrammatic detail of the same apparatus, seen laterally.

Like numerals represent like parts throughout the several figures of the drawings.

In the embodiment shown, the copying apparatus forming the object of the present invention comprises mainly two divergent tubes 1 and 1', the axes of which form a certain angle with regard to vertical and in said tubes the corresponding optical systems are mounted, comprising objectives 2 and 2', respectively, slidably mounted in said tubes, in order to ensure precise focusing, whereas, in turn, at the free end of tube 2', a prism 3 is arranged, the purpose of which will be explained further on.

From Figure 1 it can be seen, furthermore, that in the upper extremities, i. e., the convergent extremities of tubes 1 and 1', a frame-shaped plate has been adapted, comprising pairs of adjacent plates 4, between which the corresponding film 5 may slide, said film being the bearer of a negative double image; in turn, confronting the opening of said plate an angular mirror is adjusted, said mirror being formed of faces 6 and 6', arranged at a suitable angle.

In turn, facing said mirrors 6 and 6', fixed tubes 7 and 7' are respectively arranged, supporting double condensers 8 and 8', comprising pairs of plane-convex lenses, on which luminous rays emitted by lamps 9 and 9' fall, said condensers being held by respective tubes 10 and 10', axially slidably mounted over tubes 7 and 7', above described, enabling the change of position of said lamps with regard to the respective condensers.

The assembly above described is arranged on a rigid support 11, duly joined to a bushing 12, slidably mounted on column 13, equipped with pedestal 14, and capable of being fixed at the required height, through screw 15 or similar means.

Film 5, to be copied, is made to run between plates 4 by means of an adequate traction system comprising, for example, a toothed roller 16, actuated by means of a Maltese cross in cases where the apparatus is adapted, as is supposed to be the present case, to 35 mm. wide films, although the apparatus is adaptable to other types of films, as also to any size of negative, according to the needs of each particular case; said traction system, which, as it may be of any known kind, has not been illustrated nor described, may be hand-operated, through crank 17 or similar means, or automatic or semi-automatic.

The operation of the apparatus as described is very simple, actually taking place in the following manner.

The negative of film 5 to be copied, is made to pass through plates 4, the position of lamps 9 and 9' having been previously adjusted, as well as that of objectives 2 and 2', respectively, one of said objectives being of variable focal distance, the focal distance of the remaining objective being approximately 55 mm.; in these conditions, the light beams emitted by said lamps, after passing through condensers 8 and 8' respectively, fall upon mirrors 6 and 6', which deflect the rays towards images 18 and 18' respectively belonging to front and profile photographs of the subject; these images, through objectives 2 and 2', are projected without any interference upon the copy paper carrying frame, the dimensions of which will have been fixed in accordance with the requirements of each case; during this operation, prism 3, adapted to the extreme of objective 2', inverts the position of image 18', corresponding to the profile negative, thus cancelling the original inversion of said negative. As a result of this inversion, it is possible to secure clear-cut copies as detailed as those that could be obtained by the usual direct contact process.

Low voltage filament, pointed-beam lamps are preferably employed for the lighting system.

The independent regulating system provided for each one of said lamps, makes it possible to give to each portion of the negative the luminous intensity capable of compensating the difference noted between the different images on said negative and which have been taken simultaneously as front and profile views.

The invention as set forth herein may be clearly understood and no further explanations will be required by those versed in the matter.

Evidently several changes may be introduced in construction and detail of the apparatus according to this invention, without thereby departing from the essential nature of same as set forth in the following claims.

I claim:

1. An optical printer for double photographs of the same object simultaneously taken on one and the same film comprising a support, a housing carried by the support, film moving means in the housing, a pair of spaced film guide means supported on top of the housing, a pair of mirrors on one side of the plane of the film guide means and between the edges of the film guide means carried by the support and forming an angle having a vertex parallel to the plane of and to either of the film guide means, a pair of condensers mounted on the support one on either side of the plane bisecting the mirror angle and each mounted in a tube, a pair of light sources each mounted in a second tube telescopically related to a condenser tube and therefore adjustable longitudinally and transversely of the axis of a condenser, a pair of objectives mounted on the support one on either side of the plane bisecting the mirror angle, and an image-inverting prism carried by one of the objectives.

2. An optical printer for double photographs of the same object simultaneously taken on one and the same film, comprising a support, a housing carried by the support, film moving means in the housing, film guide means supported on top of the housing, a pair of mirrors carried by the support and forming an angle having a vertex parallel to the plane of and to either of the film guide means, a pair of longitudinally slotted tubes fixed on the support one on either side of the plane bisecting the mirror angle, a pair of condensers each fixed in the end of a tube nearest a mirror, a second pair of laterally apertured tubes each slidably mounted over one of the first pair of tubes, a third pair of tubes each extending into the slot of one of the first pair of tubes and fixed in an aperture of one of the second pair of tubes, a fourth pair of tubes each slidable in one of the third pair of tubes, a pair of lamps each fixed in one end of one of the fourth pair of tubes, a pair of objectives mounted on the support one on either side of the plane bisecting the mirror angle, and an image-inverting prism carried by one of the objectives.

ADOLFO ARMELLINO.

REFERENCES CITED

The following references are of record in the file of this patent:

UNITED STATES PATENTS

| Number | Name | Date |
|---|---|---|
| Re. 14,805 | Doane | Feb. 19, 1920 |
| 1,505,268 | Larson | Aug. 19, 1924 |
| 1,860,951 | Proctor | May 31, 1932 |
| 2,021,507 | Hanks | Nov. 19, 1935 |
| 2,066,436 | Bowen | Jan. 5, 1937 |
| 2,125,388 | Monroe | Aug. 2, 1938 |
| 2,273,512 | Caldwell | Feb. 17, 1942 |
| 2,333,389 | Ringer | Nov. 2, 1943 |
| 2,372,910 | Pratt | Apr. 3, 1945 |
| 2,442,564 | Heijer | June 1, 1948 |